United States Patent [19]

Dobben

[11] 3,855,405

[45] Dec. 17, 1974

[54] RADIOGRAPHIC CONTRAST COMPOSITION CONTAINING 2',6'-DIIODO-DL-THYRONINE AND METHODS OF USE THEREOF

[75] Inventor: Glenn D. Dobben, South Holland, Ill.

[73] Assignee: E. R. Squibb & Sons, Inc., New York, N.Y.

[22] Filed: Nov. 26, 1969

[21] Appl. No.: 880,406

[52] U.S. Cl. .................... 424/5, 424/319, 424/362, 424/365
[51] Int. Cl. ............................................ A61k 27/08
[58] Field of Search ............ 424/5, 319; 260/518 A

[56] References Cited
UNITED STATES PATENTS

| | | | |
|---|---|---|---|
| 3,035,974 | 5/1962 | Israel | 424/319 X |
| 3,102,880 | 9/1963 | Rands | 424/5 X |
| 3,157,574 | 11/1964 | Heming et al. | 424/319 |
| 3,175,952 | 3/1965 | Bird | 424/5 |
| 3,218,349 | 11/1965 | Chapman et al. | 424/5 X |
| 3,325,370 | 6/1967 | Holtermann et al. | 424/5 |
| 3,347,746 | 10/1967 | Holtermann et al. | 424/5 |
| 3,360,434 | 12/1967 | Udenfriend et al. | 424/319 |
| 3,360,436 | 12/1967 | Felder et al. | 424/5 |

OTHER PUBLICATIONS

Chemical Abstracts, Vol. 53: Column 1283h, (1950).
Cortell, The Journal of Clinical Endocrinology, Vol. 9, No. 10, Oct. 1949, pp. 955–966.

*Primary Examiner*—Jerome D. Goldberg
*Assistant Examiner*—Vera C. Clarke
*Attorney, Agent, or Firm*—Lawrence S. Levinson; Merle J. Smith

[57] ABSTRACT

A biologic radiographic contrast composition containing 2', 6'-diiodo-dl-thyronine is useful for the visualization of the subarachnoid space, ventricles of the brain, tracheo-bronchial tree and lymph vessels.

8 Claims, No Drawings

RADIOGRAPHIC CONTRAST COMPOSITION CONTAINING 2',6'-DIIODO-DL-THYRONINE AND METHODS OF USE THEREOF

BACKGROUND AND DESCRIPTION OF THE INVENTION

There have been many attempts to produce radiopaque substances and compositions which can be injected into the subarachnoid space, the ventricles of the brain, tracheobronchial tree, lymph vessels and elsewhere for visualization of such systems without undue, undesired effects. The search for improved agents for these purposes is a continuing one.

It has been found that compositions containing 2',6'-diiodo-dl-thyronine provide new and useful radiographic contrast agents. Most especially, such a composition shows utility as an encephalomyelographic contrast material and in this procedure does not show toxic effects in animals. The opacity is satisfactory and the material is resorbed within an acceptable period of time.

The compositions of this invention are useful for visualization of the spinal canal and ventricles of the brain, the tracheo-bronchial tree and the lymph vessels. The compound 2',6'-diiodo-dl-thyronine is suspended or dissolved in a sterile physiologically acceptable vehicle for injection or instillation. The composition may be an aqueous suspension or oil solution depending upon the use to which it is put. Similarly, the concentration of the 2',6'-diiodo-dl-thyronine varies with the use, e.g., in the range of about 200 to 500 mg./ml. Suspending agents, chelating agents, preservatives and the like may be included as the composition requires.

The concentration of 2',6'-diiodo-dl-thyronine in the suspending fluid for visualization by radiography is in the range of about 200 to 500 mg./ml., preferably about 400 to 500 mg./ml. For example, for use in encephalomyelography, sterile 2',6'-diiodo-dl-thyronine is suspended in either bank-filtered cerebrospinal fluid or fluid withdrawn at the time of performing the radiography. For injection within the subarachnoid space or the ventricles of the brain an 18 gauge needle may be employed. The procedure of choice in taking myelograms or ventriculograms is to withdraw an amount of spinal or ventricular fluid in which the 2',6'-diiodo-dl-thyronine is homogeneously suspended and then the liquid suspension is reinjected. Generally about 2 to 10 ml. of fluid are involved.

As an alternative, the 2',6'-diiodo-dl-thyronine may be suspended in Elliot's Solution A (9 percent sodium chloride, 0.3 percent potassium chloride, 0.2 percent calcium chloride, 0.3 percent magnesium sulfate, 1 percent dextrose in water—all proportions by weight in water by volume) in the concentration indicated above. An isotonic suspension is desired. It is generally desirable to withdraw the same amount of spinal or ventricular fluid as is to be replaced by an equivalent amount of the contrast medium.

For bronchography, a more viscous suspension which does not diffuse into the alveoli is used. For this purpose there is used a sterile aqueous suspension containing about 400 to 500 mg./ml. of 2', 6'-diiodo-dl-thyronine along with about 1 to 2 percent by weight of a physiologically acceptable thickening agent such as sodium carboxymethyl cellulose, or the like. This suspension is instilled into the specific area of the tracheobronchial tree by catheter.

An oil solution may be used for lymphangiography. 2',6'-diiodo-dl-thyronine is dissolved in a physiologically acceptable low viscosity natural or synthetic oil such as vegetable oil or ethyl oleate. The solution is injected into the lymph vessels, previously outlined by subcutaneous injection of visible dye, with a small needle of the order of 28 or 29 gauge.

By way of illustration, 2', 6'-diiodo-dl-thyronine [synthesized by the method of Nieman and Mc Casland, J.A.C.S. 66, 1870 (1944)] was homogeneously suspended in 2 ml. of bank-filtered cerebrospinal fluid at a concentration of 500 mg./ml. This suspension was injected into the lumbar subarachnoid space and cerebral ventricles of each of two 1 year old Rhesus monkeys under sodium pentabarbital anesthesia. Opacification of the area under study was achieved shortly after injection and gave acceptable radiographs. Both animals tolerated the contrast material without incident and showed no latent effects. About 70 percent of the contrast material was resorbed from the spinal canal in an 8 week period.

The following are compositions illustrative of the present invention.

EXAMPLE 1

Elliot's Solution A is prepared by thorough admixture of the following ingredients. Sterile substances are used and admixed under aseptic conditions.

| | |
|---|---|
| Sodium chloride | 9.0 gm. |
| Potassium chloride | 0.3 gm. |
| Calcium chloride | 0.2 gm. |
| Magnesium sulfate | 0.3 gm. |
| Dextrose | 1.0 gm. |
| Water qs. | 1 liter |

500 gm. of sterile crystalline 2',6'-diiodo-dl-thyronine are suspended in the solution. The mixture is mixed under sterile conditions until a homogeneous suspension is obtained. The suspension is filled into sterile bottles and sealed.

EXAMPLE 2

A sterile aqueous suspension is prepared by thoroughly admixing the following ingredients until a homogeneous suspension is obtained:

| | |
|---|---|
| 2',6'-diiodo-dl-thyronine (micronized, sterile) | 400 gm. |
| Sodium carboxymethyl cellulose (medium viscosity) | 10 gm. |
| Methyl paraben | 1 gm. |
| Propyl paraben | 0.1 gm. |
| Disodium edetate | 0.4 gm. |
| Water qs. | 1 liter |

The suspension is filled into sterile bottles and sealed.

EXAMPLE 3

250 gm. of 2',6'-diiodo-dl-thyronine are dissolved in 1 liter of ethyl oleate. The solution is sterile filtered, filled into sterile bottles and sealed.

For the preparation of a suspension using cerebrospinal fluid as diluent, dry sterile 2',6'-diiodo-dl-thyronine is sealed in sterile vials each containing up to 1 gm. and sealed.

What is claimed is:

1. An encephalomyelographic, bronchographic or lymphangiographic composition for radiography comprising about 200 to 500 mg./ml. of 2',6'-diiodo-dl-thyronine in a sterile physiologically acceptable vehicle for injection or instillation.

2. An encephalomyelographic composition comprising about 400 to 500 mg./ml. of 2',6'-diiodo-dl-thyronine in cerebrospinal fluid.

3. An encephalomyelographic composition for radiography comprising about 400 to 500 mg./ml. of 2',6'-diiodo-dl-thyronine in an aqueous solution comprising sodium chloride, potassium chloride, calcium chloride, magnesium sulfate and dextrose.

4. A bronchographic composition for radiography comprising a sterile aqueous suspension containing about 400 to 500 mg./ml. of 2',6'-diiodo-dl-thyronine.

5. A lymphangiographic composition for radiography comprising about 400 to 500 mg./ml. of 2',6'-diiodo-dl-thyronine dissolved in a physiologically acceptable low viscosity vegetable or synthetic oil.

6. A method for radiographically visualizing the subarachnoid space, ventricle of the brain, tracheobronchial tree or lymph vessel of an animal which comprises injecting or instilling in the area of study a composition of claim 1 and X-raying that area.

7. A method of encephalomyelography which comprises injecting into the subarachnoid space or cerebral ventricle of an animal a composition of claim 1.

8. A method as in claim 7 wherein the composition comprises about 400 to 500 mg./ml. of 2',6'-diiodo-dl-thyronine in cerebrospinal fluid.

* * * * *